(12) United States Patent
Kohli et al.

(10) Patent No.: US 10,154,041 B2
(45) Date of Patent: Dec. 11, 2018

(54) WEBSITE ACCESS CONTROL

(71) Applicant: Microsoft Technology Licensing, LLC, Redmond, WA (US)

(72) Inventors: Pushmeet Kohli, Cambridge (GB); Yoram Bachrach, Cambridge (GB); Filip Radlinski, Cambridge (GB); Ulrich Paquet, Cambridge (GB); Li Quan Khoo, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 14/595,630

(22) Filed: Jan. 13, 2015

(65) Prior Publication Data

US 2016/0205109 A1 Jul. 14, 2016

(51) Int. Cl.
*G06F 15/173* (2006.01)
*H04L 29/06* (2006.01)
(Continued)

(52) U.S. Cl.
CPC ...... *H04L 63/102* (2013.01); *G06F 17/30876* (2013.01); *G06F 21/6218* (2013.01); *G06F 21/6254* (2013.01); *H04L 63/101* (2013.01); *G06F 2221/2137* (2013.01); *G06F 2221/2149* (2013.01)

(58) Field of Classification Search
CPC .............. H04L 63/102; H04L 63/101; G06F 17/30876; G06F 21/00; G06F 2221/2149
See application file for complete search history.

(56) References Cited

U.S. PATENT DOCUMENTS 6,853,982 B2 2/2005 Smith et al.
7,376,752 B1 * 5/2008 Chudnovsky ..... G06F 17/30887
709/217
(Continued)

FOREIGN PATENT DOCUMENTS

CN 103246739 A 8/2013
GB 2366888 A 3/2002
(Continued)

OTHER PUBLICATIONS

PCT Search Report for corresponding PCT Application No. PCT/US2015/067551 dated Jun. 9, 2016, 10 pages.
(Continued)

*Primary Examiner* — Blake J Rubin
(74) *Attorney, Agent, or Firm* — Schwegman Lundberg & Woessner, P.A.

(57) ABSTRACT

A method of controlling access to content such as web sites on the intranet or interne is described. For example, the method comprises receiving an address of content to be accessed and obtaining similarity of the address to previously labeled addresses of other content items. The similarity is based on co-occurrence of addresses of content items in records of browsing sessions from many consenting users. For example, a browsing session record comprises addresses of content items accessed by a user in a time period during which the user is actively accessing content. A co-occurrence of addresses of content items is the existence of the addresses in the same browsing session record. Access to the content is then controlled on the basis of the similarity.

20 Claims, 6 Drawing Sheets

(51) Int. Cl.
*G06F 17/30* (2006.01)
*G06F 21/62* (2013.01)

(56) References Cited

U.S. PATENT DOCUMENTS

| | | | |
|---|---|---|---|
| 7,631,007 B2 | 12/2009 | Morris | |
| 7,854,001 B1* | 12/2010 | Chen | H04L 12/24 726/11 |
| 7,865,953 B1* | 1/2011 | Hsieh | G06F 17/30887 726/22 |
| 7,873,904 B2 | 1/2011 | Wang et al. | |
| 7,945,668 B1 | 5/2011 | Nucci et al. | |
| 8,095,530 B1* | 1/2012 | Lloyd | G06F 7/02 707/664 |
| 8,209,390 B1* | 6/2012 | Gibbs | H04L 51/28 709/206 |
| 8,234,582 B1 | 7/2012 | Haynes et al. | |
| 8,296,255 B1 | 10/2012 | Wawda | |
| 8,429,180 B1* | 4/2013 | Sobel | G06F 21/55 707/758 |
| 8,577,900 B2 | 11/2013 | Bao et al. | |
| 8,631,498 B1* | 1/2014 | Hart | H04L 63/145 726/22 |
| 8,640,190 B1 | 1/2014 | Banerjee | |
| 8,645,683 B1* | 2/2014 | Emigh | H04L 63/123 709/218 |
| 8,775,942 B2 | 7/2014 | Harinarayan et al. | |
| 8,826,444 B1* | 9/2014 | Kalle | H04N 21/25816 709/223 |
| 8,850,567 B1* | 9/2014 | Hsieh | H04L 63/1483 726/22 |
| 8,881,225 B1 | 11/2014 | Caola et al. | |
| 8,898,272 B1* | 11/2014 | Young | H04L 63/0407 709/223 |
| 8,972,412 B1* | 3/2015 | Christian | G06F 17/30882 707/748 |
| 9,292,691 B1* | 3/2016 | Hittel | G06F 21/57 |
| 9,298,824 B1* | 3/2016 | Vinnik | G06F 17/30864 |
| 9,563,335 B1* | 2/2017 | DeLuca | G06F 3/0482 |
| 9,584,580 B2* | 2/2017 | Brundage | G06F 17/30887 |
| 9,635,049 B1* | 4/2017 | Oprea | H04L 63/145 |
| 2003/0191971 A1 | 10/2003 | Klensin et al. | |
| 2005/0198319 A1 | 9/2005 | Chan et al. | |
| 2006/0012094 A1* | 1/2006 | Wang | B25B 11/002 269/8 |
| 2006/0042650 A1* | 3/2006 | Ochs | A61C 15/00 132/323 |
| 2006/0080444 A1* | 4/2006 | Peddemors | H04L 63/101 709/227 |
| 2007/0005646 A1 | 1/2007 | Dumais et al. | |
| 2008/0214204 A1 | 9/2008 | Ramer et al. | |
| 2008/0307091 A1 | 12/2008 | Sakamaki et al. | |
| 2009/0132459 A1* | 5/2009 | Hicks | G06Q 30/0269 706/52 |
| 2009/0171968 A1* | 7/2009 | Kane | G06F 17/30867 |
| 2009/0287705 A1* | 11/2009 | Schneider | G06F 17/30864 |
| 2009/0300768 A1* | 12/2009 | Krishnamurthy | G06F 21/552 726/26 |
| 2010/0017865 A1* | 1/2010 | Leahy | C12N 5/0636 726/7 |
| 2010/0082811 A1* | 4/2010 | Van Der Merwe | G06F 17/30867 709/225 |
| 2010/0186088 A1* | 7/2010 | Banerjee | G06F 21/51 726/23 |
| 2010/0205297 A1* | 8/2010 | Sarathy | H04L 43/00 709/224 |
| 2011/0289434 A1* | 11/2011 | Kieft | G06F 17/30887 715/760 |
| 2011/0313850 A1* | 12/2011 | Hahn | G06Q 30/0246 705/14.45 |
| 2012/0005743 A1* | 1/2012 | Kitazawa | H04L 63/1425 726/13 |
| 2012/0060221 A1* | 3/2012 | Gerber | G06F 21/56 726/25 |
| 2012/0167210 A1* | 6/2012 | Oro Garcia | H04L 63/1425 726/22 |
| 2012/0173699 A1 | 7/2012 | Niemela | |
| 2012/0192277 A1* | 7/2012 | Jakobsson | G06F 21/31 726/24 |
| 2013/0117677 A1 | 5/2013 | St. Jacques, Jr. | |
| 2013/0144834 A1* | 6/2013 | Lloyd | G06F 17/30864 707/617 |
| 2013/0225151 A1 | 8/2013 | King et al. | |
| 2013/0263263 A1* | 10/2013 | Narkolayev | G06F 21/51 726/22 |
| 2014/0006399 A1 | 1/2014 | Vasudevan et al. | |
| 2014/0149409 A1* | 5/2014 | Lamba | G06F 17/30598 707/737 |
| 2015/0200962 A1* | 7/2015 | Xu | G06F 21/562 726/23 |
| 2015/0237055 A1* | 8/2015 | Canoy | H04L 63/101 726/1 |
| 2015/0244728 A1* | 8/2015 | Tao | H04L 63/14 726/23 |
| 2015/0324468 A1* | 11/2015 | Okamoto | G06F 17/3053 707/706 |
| 2016/0044054 A1* | 2/2016 | Stiansen | H04L 63/1416 726/24 |
| 2016/0142429 A1* | 5/2016 | Renteria | H04L 51/12 726/23 |
| 2016/0352772 A1* | 12/2016 | O'Connor | H04L 63/145 |
| 2016/0364428 A1* | 12/2016 | Harris | G06F 17/30011 |
| 2016/0371507 A1* | 12/2016 | Jakobsson | H04L 63/04 |

FOREIGN PATENT DOCUMENTS

| | | |
|---|---|---|
| KR | 20120070403 A | 6/2012 |
| WO | 2006123366 A1 | 11/2006 |
| WO | 2013138743 A1 | 9/2013 |

OTHER PUBLICATIONS

Velayathan, et al., "Behavior-Based Web Page Evaluation", In International Conference on Web Intelligence and Intelligent Agent Technology Workshops, Dec. 2006, 4 pages.

Velayathan, et al., "Investigating User Browsing Behavior", In International Conferences on Web Intelligence and Intelligent Agent Technology, Nov. 5, 2007, pp. 195-198.

Paquet, et al., "One-class Collaborative Filtering with Random Graphs", In Proceedings of the 22nd international conference on World Wide Web, May 13, 2013, pp. 999-1008.

Gyongyi, et al., "Combating Web Spam with TrustRank", In Proceedings of the Thirtieth international conference on Very large data bases—vol. 30, Aug. 31, 2004, pp. 576-587.

Page, et al., "The PageRank Citation Ranking: Bringing Order to the Web", In Technical Report, Stanford InfoLab, Jan. 29, 1998, 17 pages.

Hu, et al., "WiFi Epidemiology: Can Your Neighbors' Router Make Yours Sick?", In Proceedings of the National Academy of Sciences, vol. 106, No. 5, Feb. 3, 2008, 22 pages.

Jansen, et al., "Defining a Session on Web Search Engines", In Journal of the American Society for Information Science and Technology, vol. 58, Issue 6, Apr. 2007, pp. 862-871.

Jones, et al., "Beyond the Session Timeout: Automatic Hierarchical Segmentation of Search Topics in Query Logs", In Proceedings of the 17th ACM Conference on Information and Knowledge Management, Oct. 26, 2008, pp. 699-708.

"Public Suffix List", Nov. 14, 2014, Available at: https://publicsuffix.org.

"OpenDNS: Cloud-Delivered Security Enforcement and Intelligence", Nov. 14, 2014, Available at: http://www.opendns.com/.

Scholkopf et al "Comparing Support Vector Machines with Gaussian Kernels to Radial Basis Function Classiers", A.I. Memo No. 1599, Dec. 1996 C.B.C.L. Paper No. 142.

\* cited by examiner

| CONFIRMED | BLACKLIST |
|---|---|
| ✓ | SHOPXX.COM |
|  | ABCXX.COM |
|  | NEWS2.COM |
| ✓ | SOAPCATCHUP.COM |
|  | • • • |
|  | • • • |

FIG. 3

WEBSITE ACCESS CONTROL

BACKGROUND

A big problem for controlling access to portions of the World Wide Web is that the number of web addresses is gigantic, and the ownership and content of addresses change over time.

Previous approaches for web access control make use of manually composed white and blacklists, which may be collaboratively maintained by many users. White and blacklists rely on human manual input for updates, and are binary in nature. If the lists are about sites with violent content, for instance, they contain no information about any other kind of site. If a manager wishes to block employees from visiting news sites during working hours, if there is no such list of sites, then it cannot be done. This means the manager, parent, or other person trying to control interne access has to tailor their requirements to the lists available, rather than the other way around.

The embodiments described below are not limited to implementations which solve any or all of the disadvantages of known web site access control systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A method of controlling access to content such as web sites on the intranet or interne is described. For example, the method comprises receiving an address of content to be accessed and obtaining similarity of the address to previously labeled addresses of other content items. The similarity is based on co-occurrence of addresses of content items in records of browsing sessions from many consenting users. For example, a browsing session record comprises addresses of content items accessed by a user in a time period during which the user is actively accessing content. A co-occurrence of addresses of content items is the existence of the addresses in the same browsing session record. Access to the content is then controlled on the basis of the similarity.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 3 is a schematic diagram of a graphical user interface of a blacklist of websites comprising manually specified blacklist items and automatically determined blacklist items;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In various examples an improved website filter is provided, which automatically determines whether to allow, block or recommend blocking, content at a given address. This is achieved by using a measure of similarity between addresses of content, which is based on large scale browsing session co-occurrence data. One or more addresses of content to be blocked is known, from user input or other sources. Similarity of other addresses to the blocked addresses is computed using the measure of similarity based on the co-occurrence data. The similarity data is then used to control access to content without the need for manual input. In this way personalized website access control is achieved without the need for personalized blacklists to be manually compiled. In addition, the website access control is dynamic and changes over time as changes in the World Wide Web occur, and/or with changes in end user content control criteria. In this way, automatic control of access to content is achieved without the need to analyze the content itself For example, there is no need to download the content and carry out textual analysis or to categorize the content semantically.

Figure 1:
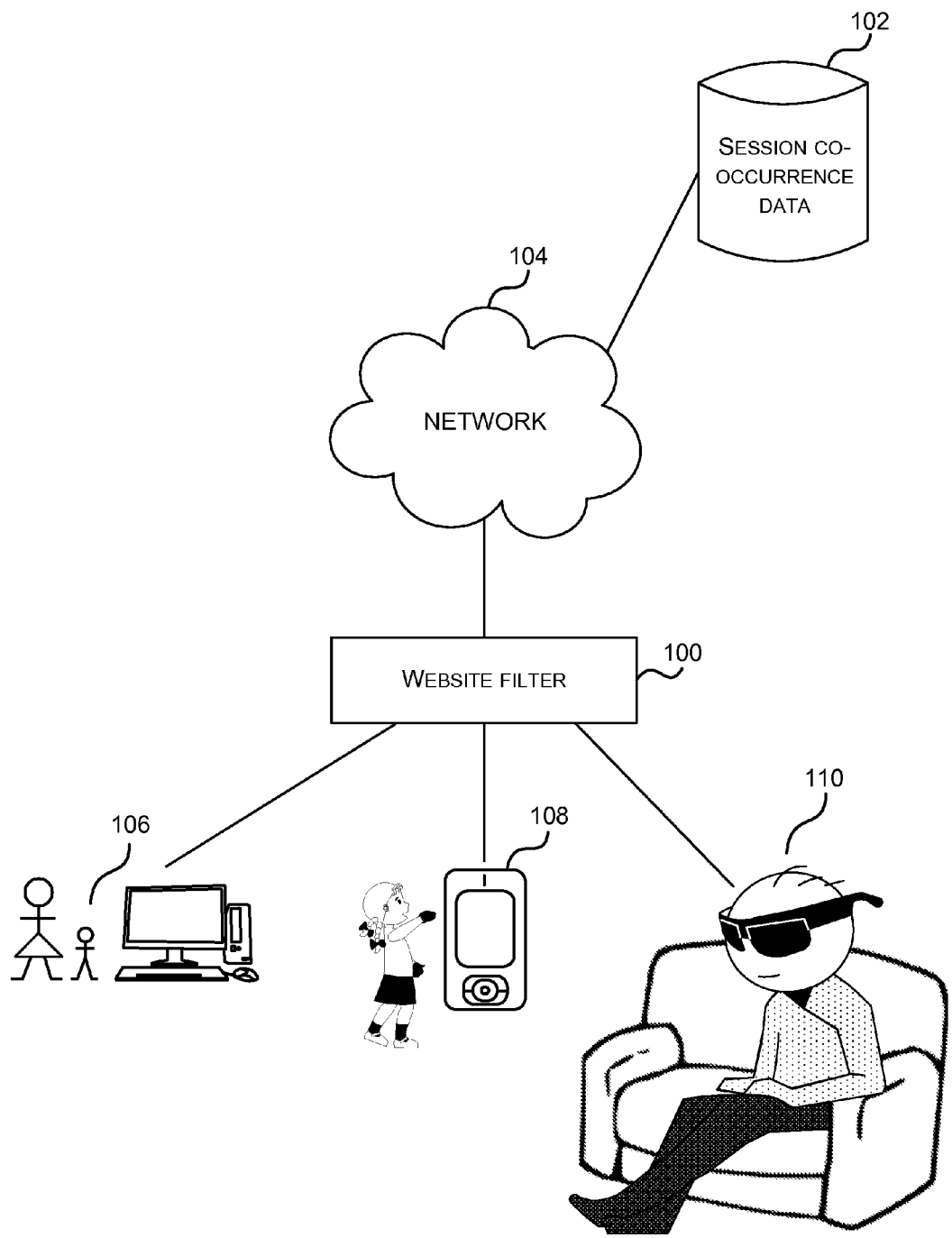
FIG. 1 is a schematic diagram of a website filter using session co-occurrence data.

FIG. 1 is a schematic diagram of a website filter 100 using session co-occurrence data 102. The website filter 100 is computer-implemented using software and/or hardware and is located, in some examples, at an end user device such as personal computer 106, mobile phone 108, wearable computing device 110, or other end user device. In some examples, the website filter is part of the operating system of the end user device. The website filter 100 may be located at any network node at or between an end user device and a content provider node. A content provider node is any content store in communications network 104 from which an end user device is able to access content. For example, the content provider node may be a web server, another end user device, or any other content provider node. The website filter functionality may also be distributed between a plurality of entities at or between an end user device and a content provider node.

The website filter 100 has access to session co-occurrence data 102 stored at one or more locations in network 104. Session co-occurrence data is computed from browsing session records of many consenting users. For example, millions of browsing session records from hundreds of thousands of different users who have consented to their browsing sessions being recorded and used for website filtering. The browsing session records are recorded in a way which anonymizes the records so that individual users are not identifiable from the browsing session records. A browsing session record comprises addresses of content items accessed by a user in a time period during which the user is actively accessing content. For example, addresses of content items accessed by the same device (such as an end user device or a wireless access point, or other node of network 104), or by a plurality of devices associated with a single user, where the length of time between content access events is below a threshold. Addresses in the same browsing session record are said to co-occur.

Session co-occurrence data may be computed from browsing session records in various ways. For example, by creating a matrix with a row for each address observed in the browsing session records, and a column for each address observed in the browsing session records. Entries in the matrix are filled with a numerical value representing the frequency of co-occurrence of pairs of the addresses specified according to the rows and columns. The frequency values may be divided by the total number of times the addresses of the pair were observed individually in the browsing session records.

In another example, session co-occurrence data is computed by calculating a multi-dimensional feature vector for each address and computing similarities between pairs of the feature vectors. Other ways of computing the session co-occurrence data may be used.

The website filter is configured to receive an address of content to be accessed. For example, the website filter may be part of an operating system at an end user device and can be configured to intercept web page requests outgoing from the end user device. The website filter may be part of a firewall which intercepts web page requests from a plurality of computing devices on a local area network, intranet, enterprise network or other managed network. In some examples the website filter receives the address of content to be accessed as a result of being sent the address. For example, where the website filter is provided as a cloud service or as a proxy node between end user devices and the content to be accessed.

The website filter is arranged to compute similarity of the received address to previously labeled addresses of other content items. The similarity is based at least on co-occurrence of addresses of content items in records of browsing sessions from many consenting users. For example, a browsing session record comprises addresses of content items accessed by a user in a time period during which the user is actively accessing content. A co-occurrence of addresses of content items is the existence of the addresses in the same browsing session record. Access to the content is then controlled on the basis of the similarity. For example, by blocking content automatically, by triggering an alert as part of the process of accessing the content, or in other ways. The similarity may be based on other factors in addition to session co-occurrence data. For example, content of sites, semantic similarity of site addresses or other factors.

As mentioned above, the website filter has access to one or more previously labeled addresses. These include one or more examples of address of content to be blocked. For example, these addresses are specified by the user and may be added to and/or changed by the user over time. The website filter optionally has access to one or more examples of addresses of content not to be blocked.

As mentioned above the measure of similarity is based on the session co-occurrence data 102. More detail about examples of measures of similarity which may be used are given later in this document.

Figure 2:
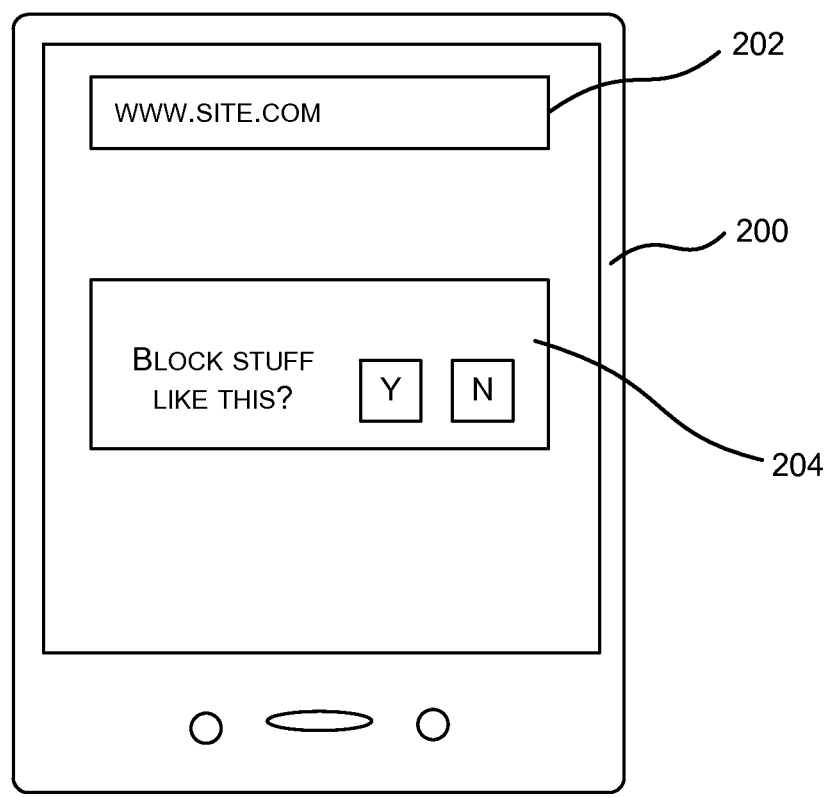
FIG. 2 is a schematic diagram of a mobile communications device being used to access content in an administration mode.

FIG. 2 is a schematic diagram of a mobile communications device 200 being used, by a parent or administrator, in an administration or set up mode. During this mode, the parent or administrator is able to give examples of sites to be blocked or allowed. For example, the parent or administrator operates the device 200 to access content which has an address 202 which is shown, in this example, in a browsing bar of a web browser graphical user interface. In this example, the website filter has computed similarity between the address 202 and previously labeled website addresses using a measure of similarity based on session co-occurrence data. The similarity was enough to indicate that the content should be blocked and so the website filter triggers an alert 204 at the web browser graphical user interface. The alert asks the user whether to "block stuff like this?" and the parent or administrator is able to enter input indicating "yes" or "no". The website filter receives the input and adds the address and label (i.e. yes/no) to a record of previously labeled addresses. If the parent or administrator enters input indicating "yes" the website filter blocks the content at address 202. Otherwise the content is accessed and displayed in the web browser graphical user interface.

FIG. 3 is a schematic diagram of a graphical user interface of a website filter showing part of a black list 300 of addresses of content which are to be blocked 302 or which are candidates for blocking 306. The website filter may use the blacklist (and optionally a white list) for controlling access to content. The black list comprises data indicating whether a user has confirmed that an entry in the blacklist should indeed be blocked (for example, this is indicated by tick marks in a column labeled "confirmed" as shown at 304). The black list comprises addresses which have been computed automatically by the website filter as having high similarity to addresses confirmed as to be blocked.

Figure 4:
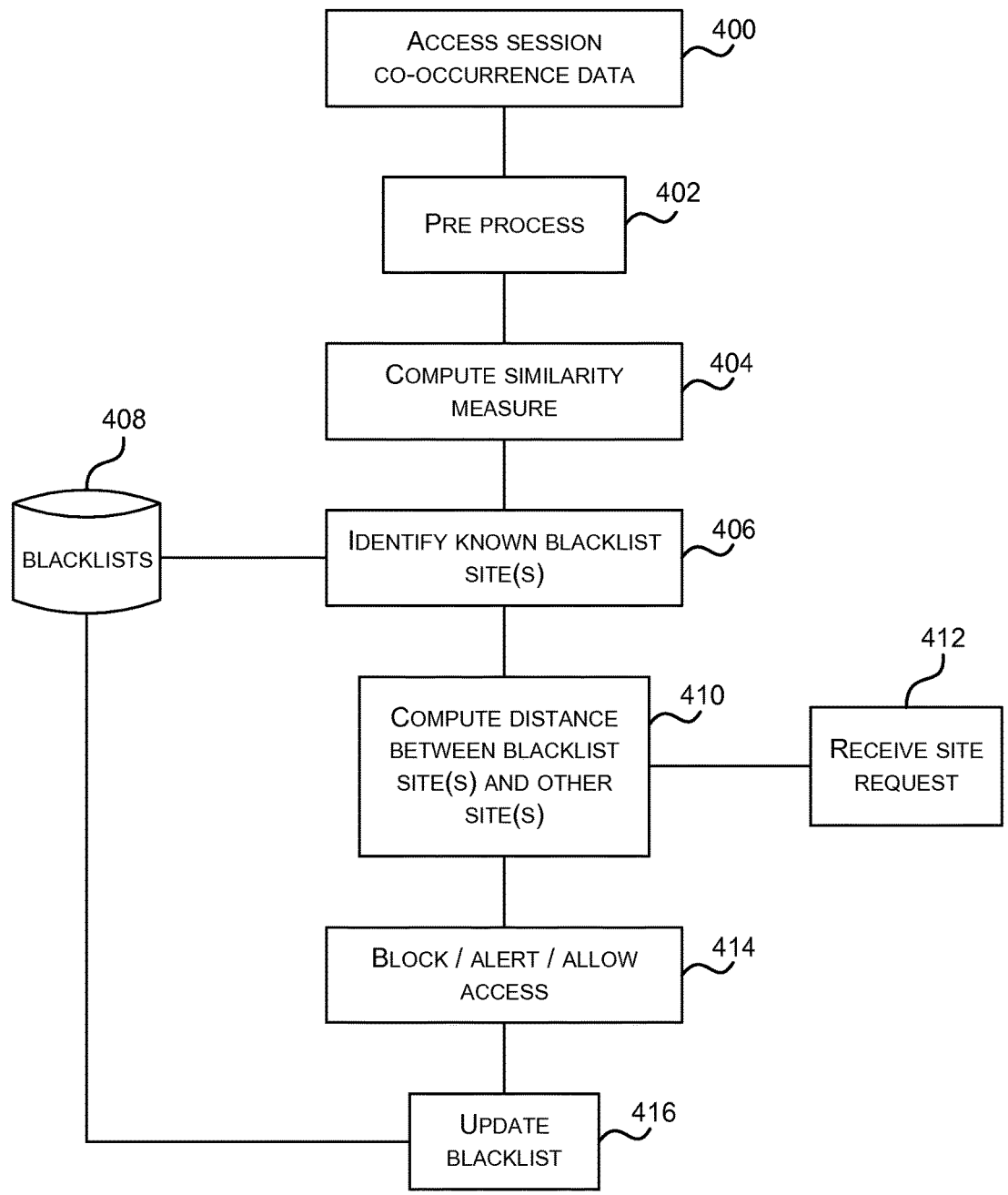
FIG. 4 is a flow diagram of a method at the website filter of FIG. 1.

FIG. 4 is a flow diagram of a method at the website filter of FIG. 1. Session co-occurrence data is accessed 400 such as session co-occurrence data 102 described above. The session co-occurrence data is optionally pre-processed, for example, to remove duplicates and in other ways described in more detail with reference to FIG. 5.

The session co-occurrence data is used to compute 404 a measure of similarity. That is, a measure of similarity between addresses of content is computed between the addresses in the session co-occurrence data. The measure of similarity, also referred to herein as a distance, is based on session co-occurrence as described in more detail with reference to FIG. 5. The results of the computation at step 404 enable similar sites to be identified because it is assumed that, in a single session, a user is accessing related, similar content.

Optionally the results of the computation at step 404 are mapped to two-dimensions so that a graphical display analogous to a 2D geographical map is rendered by the website filter. Addresses which tend to co-occur in browsing sessions appear closer to one another in the rendered map. In this way, a parent or administrator is able to review sites that they may want to consider for blocking or unblocking. The 2D display is an example of a visualization for parents and/or administrators to review what is currently blocked.

The website filter identifies 406 one or more addresses of known blacklist sites. For example, one or more of the blacklist sites are preconfigured by the manufacturer of the website filter. In examples, one or more of the blacklist sites are input by the user so that they are bespoke to the individual user. A store of blacklists 408 of different users may be held at network 104 and accessible to the website filter. Optionally, one or more addresses of known whitelist sites are identified by the website filter 406 in the same way as for blacklist sites mentioned above. The whitelists may also be bespoke to individual users.

The website filter computes distances 410 between the known blacklist site addresses and other site addresses in the map. The distances are computed using a distance metric (also referred to as a similarity measure above) based on session co-occurrence. Depending how similar/close a site address is to a known blacklist site address, it is identified as to be blocked, or to have an alert triggered, or to be allowed 414. Optionally, the blacklists 408 and whitelists in the store are updated 416 using the outcome of the decision whether to block/alert/allow content at the address.

When the website filter receives a request for a site 412 to be accessed, it computes a distance between the address of the requested site and the known blacklist sites of the associated user. For example, the website filter receives an address of content to be accessed together with an identifier of an end user device requesting access to the content. The website filter looks up data associated with a user of the end user device. For example, addresses of sites the user has previously labeled as blacklist or whitelist. The distances between the known blacklist site addresses and the requested site are computed and used to control access to the site. In this way filtering may be bespoke to individual users since the website filter may use previously labeled sites of the relevant individual. However, it is not essential for filtering to be bespoke to individual users. For example, the website filter may use data associated with a group of users such as an enterprise, or other group of users.

Where whitelist sites are known, the whitelist site addresses are also used at step 410 to compute distances between the known whitelist sites and other sites/the address of the requested site. These distances to whitelist site addresses are taken into account by the decision point at step 414.

The website filter may repeat step 404 of computing the similarity measure. This comprises repeatedly accessing the record of browsing sessions so that changes in the record of browsing sessions over time are taken into account.

The website filter may repeat step 410 so that changes in the previously labeled address over time may be taken into account.

Figure 5:
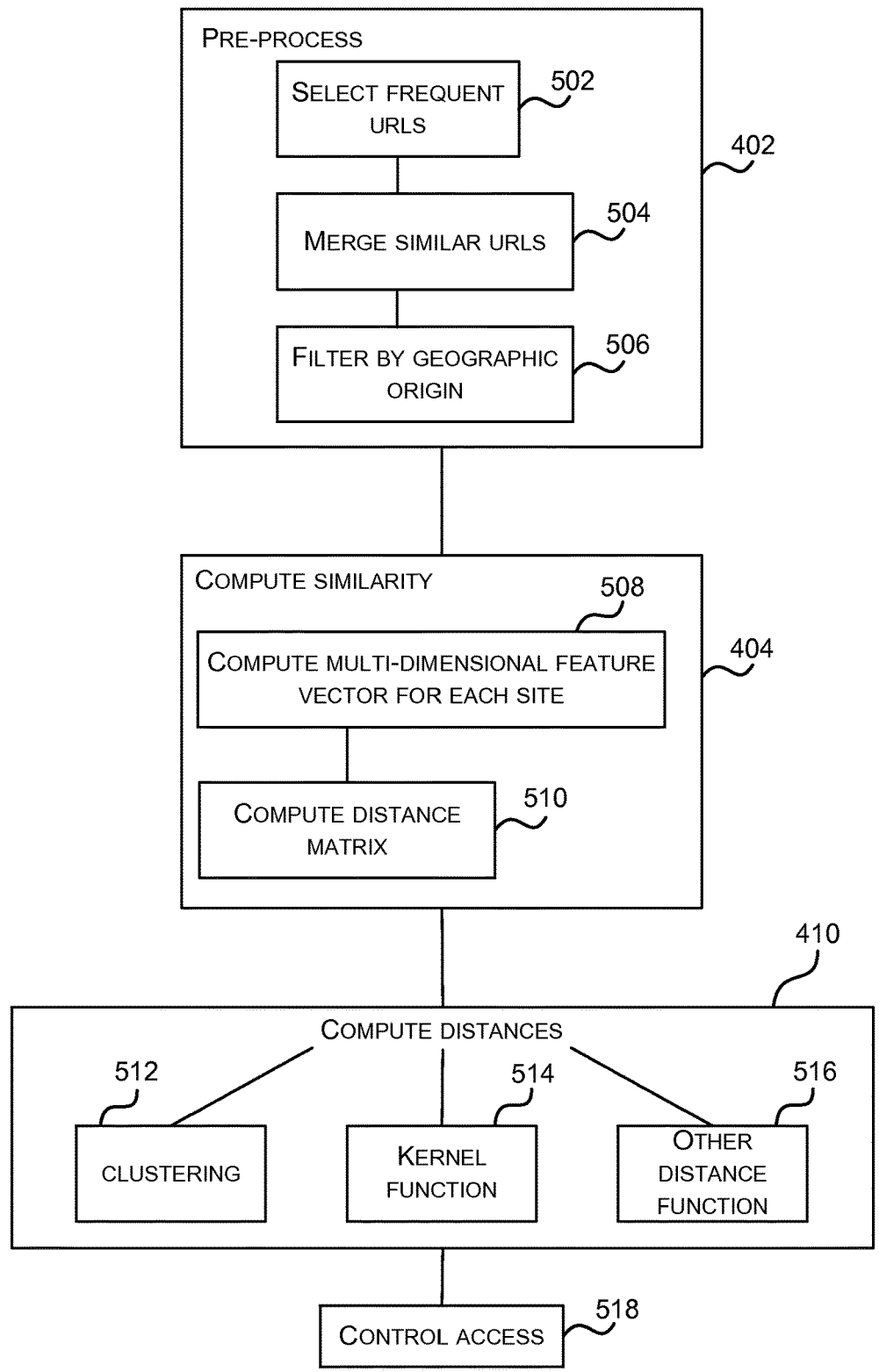
FIG. 5 is a flow diagram of an example of parts of the method of FIG. 4 in more detail.

FIG. 5 is a flow diagram of an example of parts of the method of FIG. 4 in more detail.

The pre-processing step 402 may comprise selecting 502 frequent addresses observed in the session co-occurrence data 102. The addresses may be URLs (uniform resource locators) or any other addresses of content accessible by end user equipment over a computing network. By selecting the most frequent addresses computational requirements may be traded off against performance of the website filter. It is found that good performance is achieved by selecting the ten thousand or more most frequent addresses. However, other numbers of most frequent addresses may be used.

The pre-processing step 402 may comprise merging 504 similar addresses. For example, by merging addresses with the same prefix, such as the same head URL. This enables data about the same website to be considered rather than each separate address relating to that website. Also, by grouping URLs the website filter is able to block or allow groups of URLs rather than individual URLs.

In an example, merging addresses with the same prefix comprises taking individual URLs and exploding the string of the URL by the dot character ".", and starting from the back, successively rejoining the exploded strings until there is no suffix recognizable from a preconfigured list of suffixes. The URL is then mapped to the first part which made the string not belong to any suffix. For example, www.enterprise.com would be exploded into [www, enterprise, com]. ".com" would match a suffix, but "enterprise.com" would not. Hence the process maps the root URL www.enterprise.com to "enterprise". The same goes for www.enterprise.pl, which is mapped to "enterprise" as well. In this way server names and subdomains are omitted from the website filter analysis.

The merging process may look at each item in a list of domain groups, e.g. "enterprise", and merge the URLs by substituting all site ids in a session file with the site id corresponding to the URL with the highest frequency in such a domain group. After doing so, if the session would have fewer than two unique site ids remaining it drops out of the pool of considered sessions. The frequencies of the URLs are merged in the same manner, so the final representative URL has a frequency which is its own plus that of all other URLs merged into it.

The pre-processing step 402 may comprise filtering 506 the addresses by geographic origin of the session. This is found to give improved website filter results as a result of elimination of bias and association between sites due to language and regions rather than due to function and purpose of the websites. Thus in some examples, the website filter may comprise a plurality of similarity metrics, each using session co-occurrence data from a different geographic region. As a request for content comes in, its geographic origin is detected and used to select the appropriate similarity metric.

The pre-processing step 402 may comprise any combination of one or more of the selecting 502, merging 504 and filtering 506 steps described above, with zero, one or more other pre-processing steps. For example, sessions with only one site are omitted and a site is recorded once per session.

The step of computing 404 a similarity/distance between sites in the session co-occurrence data may be carried out in various ways. For example, the similarity may be computed using the following formula:

The distance between sites A and B is equal to the number of times websites A and B occur in the same session divided by the total number of times websites A and B occur in any of the sessions.

In another example, the similarity may be computed by calculating 508 a multi-dimensional feature vector for each site. Distances between pairs of the feature vectors may be computed 510 and used to populate a distance matrix.

Once the distances have been computed at step 404 knowledge of the known blacklist sites (and optionally known whitelist sites) is applied 410 to the session co-occurrence data. In some examples, clusters of the multi-dimensional feature vectors are computed using any suitable clustering 512 algorithm such as k means, agglomerative clustering or others. Once the clusters are formed, the clusters may be identified as blacklist or whitelist depending on the frequency of occurrence of known blacklist and/or whitelist sites in the individual clusters. For example, if a cluster has one or more known blacklist sites in it then all sites in the cluster may be identified as potential blacklist sites.

In some examples a kernel based distance function is computed 514 to find potential blacklist sites close to a known blacklist site (or potential whitelist sites close to a known whitelist site). For example, a support vector machine with Gaussian kernels (or other types of kernels) may be configured to classify the sites of the session co-occurrence data, using the known blacklist and/or whitelist sites as training examples. A support vector machine is a non-probabilistic binary linear classifier. It represents examples as points in space, mapped so that known examples of two separate categories (black list or white list) are divided by a clear gap that is as wide as possible. New examples as then classified as belonging to one of the two categories, depending on which side of the gap they fall.

Other distance functions 516 may also be used to find potential blacklist sites close to a known blacklist site (or potential whitelist sites close to a known whitelist site). A non-exhaustive list of examples is: Euclidean distance, inverse cosine similarity.

In another example, the feature vectors are clustered. A user is able to block or allow whole clusters or individual websites.

More detail about how the multi-dimensional feature vectors may be computed is now given. A multi-dimensional feature vector for a website j is denoted $w_j$ and a multi-dimensional feature vector for another website k is denoted $w_k$. A session is denoted by symbol $s_i$. If websites j and k are browsed in the same session $s_i$, then the inner products $s_i^T w_j$ and $s_i^T w_k$ are similar, and hence multi-dimensional feature vectors $w_j$ and $w_k$ are also similar. Alternatively, if there is no correlation between the browsing of websites j and k in sessions, the vectors $w_j$ and $w_k$ are largely orthogonal. Therefore, the multi-dimensional feature vectors are computed from the session co-occurrence data in such a way that the inner products tend to be similar for sites browsed in the same session, and tend to be orthogonal otherwise. In an example, 30 dimensions are used. However, other numbers of dimensions may also be used. In various examples, the multi-dimensional feature vectors generalize to sites not seen in the session data.

In some examples, the multi-dimensional features are normalized to unit length (or capped to 1) and used to construct a distance matrix based on the similarity metric. The distance matrix may be used to compute clusters in the case that clusters are to be formed as mentioned above. The scores in the distance matrix may be scaled, in some examples, to scores in the distance matrix of known blacklist/whitelist sites. In this way data from the known blacklist/whitelist sites propagates to other entries in the distance matrix.

Alternatively, or in addition, the functionality of the website filter can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 6:
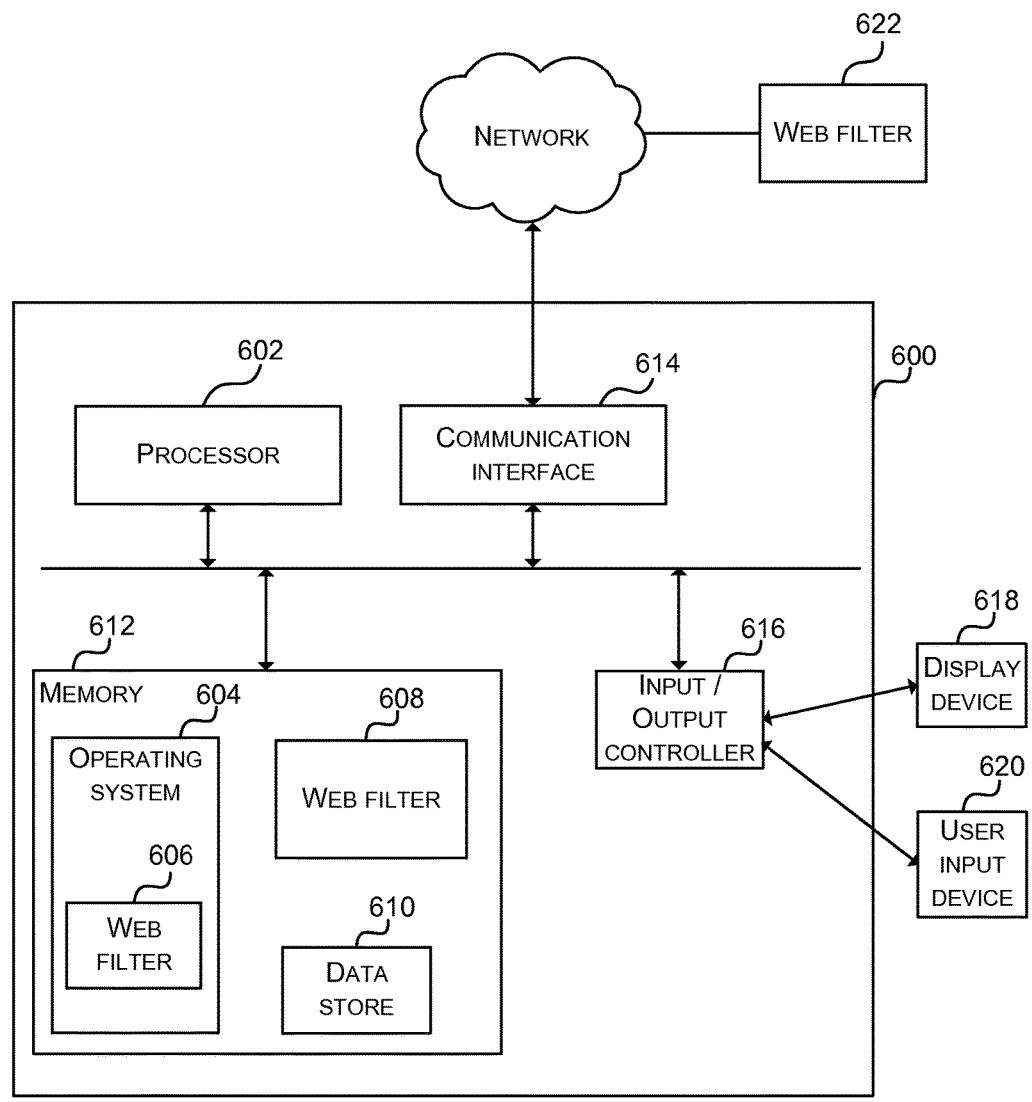
FIG. 6 illustrates an exemplary computing-based device in which embodiments of a website filter may be implemented.

FIG. 6 illustrates various components of an exemplary computing-based device 600 which may be implemented as any form of a computing and/or electronic device, and in which embodiments of a hand tracker may be implemented. For example, a mobile phone, a tablet computer, a laptop computer, a personal computer, a web server, a cloud server.

Computing-based device 600 comprises one or more processors 602 which may be microprocessors, controllers or any other suitable type of processors for processing computer executable instructions to control the operation of the device in order to control access to websites in real time. In some examples, for example where a system on a chip architecture is used, the processors 602 may include one or more fixed function blocks (also referred to as accelerators) which implement a part of the method of website filtering in hardware (rather than software or firmware). Platform software comprising an operating system 604 or any other suitable platform software may be provided at the computing-based device to enable application software 606 to be executed on the device. Data store 610 stores website address prefixes, website addresses, browsing co-occurrence data, similarity/distance metrics, similarity/distance matrices, multi-dimensional feature vectors, parameter values, blacklists, whitelists, and other data. A website filter 608 comprises instructions stored at memory 616 to execute website filtering as described herein. In some examples, a web filter 606 is part of operating system 604 in which case web filter 608 may be omitted or may share functionality with web filter 606.

The computer executable instructions may be provided using any computer-readable media that is accessible by computing based device 600. Computer-readable media may include, for example, computer storage media such as memory 616 and communications media. Computer storage media, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 612) is shown within the computing-based device 600 it will be appreciated that the storage may be distributed or located remotely and accessed via a network or other communication link (e.g. using communication interface 614).

The computing-based device 600 also comprises an input/output controller 616 arranged to output display information to a display device 618 which may be separate from or integral to the computing-based device 600. The display information may provide a graphical user interface, for example, to display blacklists and whitelists. The input/output controller 616 is also arranged to receive and process input from one or more devices, such as a user input device 620 (e.g. a mouse, keyboard, microphone or other sensor). In some examples the user input device 620 may detect voice input, user gestures or other user actions and may provide a natural user interface (NUI). In an embodiment the display device 618 may also act as the user input device 620 if it is a touch sensitive display device. The input/output controller 616 may also output data to devices other than the display device, e.g. a locally connected printing device.

Any of the input/output controller 616, display device 618 and the user input device 620 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example there is provided a website filter comprising:

an input configured to receive an address of content to be accessed;

a processor configured to obtain similarity of the address to previously labeled addresses of other content items, where the similarity is based on co-occurrence of addresses of content items in records of browsing sessions from many consenting users, a browsing session record comprising addresses of content items accessed by a given user in a time period during which the given user is actively accessing content, a co-occurrence of addresses of content items being the existence of the addresses in the same browsing session record; and an output configured to control access to the content to be accessed on the basis of the similarity.

For example the input is configured to receive the address of the content to be accessed together with an identifier of an end user device requesting access to the content; and wherein the previously labeled addresses of other content items comprise addresses labeled by a user associated with the end user device.

For example the processor is arranged to obtain the similarity from an entity which repeatedly accesses the record of browsing sessions such that changes in the record of browsing sessions over time are taken into account.

For example the processor is configured to take into account changes in the previously labeled addresses over time.

For example the processor is configured to obtain the similarity from an entity which computes the similarity between addresses A and B, at least in part, as the number of times addresses A and B occur in the same browsing session divided by the total number of times addresses A and B occur in any of the sessions.

For example the processor is configured to obtain the similarity from an entity which computes the similarity between addresses by calculating a multi-dimensional feature vector of each address and computing similarities between pairs of the feature vectors.

For example the processor is configured to obtain the similarity from an entity which computes the similarity using clustering or a kernel based distance function.

In an example a memory stores the previously labeled addresses, and the processor is configured to generate a graphical user interface requesting a label for one or more content addresses.

For example, the previously labeled addresses of other content items comprise at least one content item labeled as to be blocked.

For example the processor is configured to generate a graphical user interface displaying addresses of content and similarity of the addresses to the previously labeled addresses computed by the processor.

The website filter described in any of the paragraphs above may be integral with an operating system of an end user device such that the input is configured to intercept requests for content generated for output from the end user device and such that the operating system is configured to control access to the content on the basis of the similarity.

In an example the processor is configured to compute the similarity and wherein the processor is configured to pre-process the browsing records by any of: selecting frequent addresses, merging similar addresses, filtering by geographic origin of sessions.

In an example there is provided a computer-implemented method of controlling access to content comprising:

receiving an address of content to be accessed;

obtaining similarity of the address to previously labeled addresses of other content items, where the similarity is based on co-occurrence of addresses of content items in records of browsing sessions from many consenting users, a browsing session record comprising addresses of content items accessed by a user in a time period during which the user is actively accessing content, a co-occurrence of addresses of content items being the existence of the addresses in the same browsing session record; and controlling access to the content to be accessed on the basis of the similarity by any of: allowing access to the content, blocking access to the content, triggering an alert.

For example the method comprises receiving the address of the content to be accessed together with an identifier of an end user device requesting access to the content; and wherein the previously labeled addresses of other content items comprise addresses labeled by a user associated with the end user device.

For example, the method comprises obtaining the similarity from an entity which repeatedly accesses the record of browsing sessions such that changes in the record of browsing sessions over time are taken into account.

For example obtaining the similarity comprises any of: computing the similarity, requesting the similarity from another entity.

In an example there is provided a computer-readable media with device-executable instructions that, when executed by a computing-based device, direct the computing-based device to perform steps comprising:

receiving an address of content to be accessed;

obtaining similarity of the address to previously labeled addresses of other content items, where the similarity is based on co-occurrence of addresses of content items in records of browsing sessions from many consenting users, a browsing session record comprising addresses of content items accessed by a user in a time period during which the user is actively accessing content, a co-occurrence of addresses of content items being the existence of the addresses in the same browsing session record; and controlling access to the content to be accessed on the basis of the similarity by any of: allowing access to the content, blocking access to the content, triggering an alert.

In an example, the computer-readable media described above has device-executable instructions that, when executed by a computing-based device, direct the computing-based device to perform steps comprising receiving the address of the content to be accessed together with an identifier of an end user device requesting access to the content; and wherein the previously labeled addresses of other content items comprise addresses labeled by a user associated with the end user device.

In some examples, the instructions direct the computing-based device to perform steps comprising computing the similarity between addresses A and B as at least the number of times addresses A and B occur in the same browsing session divided by the total number of times addresses A and B occur in any of the sessions.

For example, the instructions direct the computing-based device to perform steps comprising: computing the similarity between addresses by calculating a multi-dimensional feature vector of each address.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A website filter comprising:
an input configured to receive an address of content to be accessed;
a processor configured to obtain similarity of the address to addresses of other content items that have been previously labeled, where the similarity between two addresses A and B is based on the content of the two addresses A and B being accessed in a same browsing session from a plurality of browsing sessions of many consenting users, a browsing session comprising addresses of content items accessed by a given user in a time period during which the given user is actively accessing content, a co-occurrence of the two addresses of content items in a browsing session taking place when the content of the two addresses is accessed in the browsing session, the processor further configured to obtain the similarity from an entity which computes the similarity between the two addresses A and B based, at least in part, on a number of sessions including both addresses A and B divided by a total number of sessions including address A, address B or both addresses A and B; and
an output configured to control access to the content to be accessed based on the similarity.

2. The website filter of claim 1, wherein the input is configured to receive the address of the content to be accessed together with an identifier of an end user device requesting access to the content; and wherein the addresses of other content items that have been previously labeled comprise addresses labeled by a user associated with the end user device.

3. The website filter of claim 1, wherein the processor is arranged to obtain the similarity from the entity which repeatedly accesses records of browsing sessions such that changes in the records of browsing sessions over time are taken into account for re-calculating the similarity.

4. The website filter of claim 1, wherein the processor is configured to take into account changes in addresses of other content items that have been previously labeled over time.

5. The website filter of claim 1, further comprising:
a memory storing the addresses of other content items that have been previously labeled, wherein the processor is configured to generate a graphical user interface requesting a label for one or more addresses of content.

6. The website filter of claim 1, wherein the addresses of other content items comprise at least one content item labeled as to be blocked.

7. The website filter of claim 1, wherein the processor is configured to generate a graphical user interface displaying addresses of content and similarity of the addresses to the addresses of other content items that have been previously labeled.

8. The website filter of claim 1, wherein the website filter is integral with an operating system of an end user device such that the input is configured to intercept requests for content generated for output from the end user device and such that the operating system is configured to control access to the content based on the similarity.

9. The website filter of claim 1, wherein the processor is configured to pre-process the browsing session by at least one of selecting frequent addresses, merging similar addresses, or filtering by geographic origin of sessions.

10. A computer-implemented method of controlling access to content comprising:
receiving an address of content to be accessed and an identifier of an end user device requesting access to the content;
obtaining similarity of the address to addresses of other content items that have been previously labeled, where the similarity between two addresses A and B is based on the content of the two addresses A and B being accessed in a same browsing session from a plurality of browsing sessions of many consenting users, a browsing session comprising addresses of content items accessed by a user in a time period during which the user is actively accessing content, a co-occurrence of the two addresses of content items in a browsing session taking place when the content of the two addresses is accessed in the browsing session, wherein the similarity is obtained from an entity that computes the similarity between the two addresses A and B based, at least in part, as a number of sessions including both addresses A and B divided by a total number of sessions including address A, address B or both addresses A and B;
determining access to the content to be accessed based on the identifier of the end user device and the similarity of the address to the addresses of the other content items: and
controlling access to the content by at least one of allowing access to the content, blocking access to the content, or triggering an alert.

11. The method of claim 10, wherein the addresses of other content items that have been previously labeled comprise addresses labeled by a user associated with the end user device.

12. The method of claim 10, further comprising:
obtaining the similarity from the entity which repeatedly accesses records of browsing sessions such that changes in the records of browsing sessions over time are taken into account for re-calculating the similarity.

13. A computer storage media with device-executable instructions that, when executed by a computing-based device, direct the computing-based device to perform steps comprising:
receiving an address of content to be accessed and an identifier of an end user device requesting access to the content;
obtaining similarity of the address to addresses of other content items that have been previously labeled, where the similarity between two addresses A and B is based on the content of the two addresses A and B being accessed in a same browsing session from a plurality of browsing sessions of many consenting users, a browsing session comprising addresses of content items accessed by a user in a time period during which the user is actively accessing content, a co-occurrence of the two addresses of content items in a browsing session taking place when the content of the two addresses is accessed in the browsing session;
computing the similarity between the two addresses A and B as a number of sessions including both addresses A and B divided by a total number of sessions including address A, address B or both addresses A and B;
determining access to the content to be accessed based on the identifier of the end user device and the similarity of the address to the addresses of the other content items: and
controlling access to the content by at least one of allowing access to the content, blocking access to the content, or triggering an alert.

14. The computer storage media of claim 13, wherein the addresses of other content items that have been previously labeled comprise addresses labeled by a user associated with the end user device.

15. The computer storage media of claim 13 with device-executable instructions that, when executed by a computing-based device, direct the computing-based device to perform further steps comprising:
computing the similarity between the two addresses by calculating a multi-dimensional feature vector of each address and computing similarities between pairs of the feature vectors.

16. The computer storage media of claim 13 with device-executable instructions that, when executed by a computing-based device, direct the computing-based device to perform further steps comprising:
computing the similarity using clustering or a kernel based distance function.

17. The method of claim 10, wherein the entity computes the similarity between the two addresses by calculating a multi-dimensional feature vector of each address and computing similarities between pairs of the feature vectors.

18. The method of claim 10, wherein the entity computes the similarity between the two addresses using clustering or a kernel based distance function.

19. The method of claim 10, wherein browsing session records are pre-processed by at least one of selecting frequent addresses, merging similar addresses, or filtering by geographic origin of sessions.

20. The computer storage media of claim 13, wherein browsing session records are pre-processed by at least one of selecting frequent addresses, merging similar addresses, or filtering by geographic origin of sessions.

* * * * *